(12) United States Patent
Nakagawa et al.

(10) Patent No.: US 7,919,571 B2
(45) Date of Patent: Apr. 5, 2011

(54) POLYBUTADIENE AS WELL AS RUBBER COMPOSITION USING THE SAME AND TIRE

(75) Inventors: Ryuji Nakagawa, Kodaira (JP); Junko Matsushita, Tachikawa (JP); Yoichi Ozawa, Kodaira (JP); Shojiro Kaita, Tokyo (JP); Olivier Tardif, Wako (JP)

(73) Assignees: Bridgestone Corporation, Tokyo (JP); Riken, Saitama (JP)

( * ) Notice: Subject to any disclaimer, the term of this patent is extended or adjusted under 35 U.S.C. 154(b) by 0 days.

(21) Appl. No.: 12/601,364

(22) PCT Filed: May 19, 2008

(86) PCT No.: PCT/JP2008/059155
§ 371 (c)(1),
(2), (4) Date: Apr. 13, 2010

(87) PCT Pub. No.: WO2008/146643
PCT Pub. Date: Dec. 4, 2008

(65) Prior Publication Data
US 2010/0190940 A1    Jul. 29, 2010

(30) Foreign Application Priority Data
May 23, 2007    (JP) ................. 2007-137026

(51) Int. Cl.
*C08F 136/06* (2006.01)
*C08F 4/52* (2006.01)
*C08L 9/00* (2006.01)

(52) U.S. Cl. ............. 526/340.4; 526/160; 526/335; 152/450; 152/905

(58) Field of Classification Search ............. 526/340.4, 526/335, 160; 152/905, 450
See application file for complete search history.

(56) References Cited

U.S. PATENT DOCUMENTS

| | | | | |
|---|---|---|---|---|
| 7,511,108 B2 * | 3/2009 | Suzuki et al. | ......... | 526/340.4 |
| 7,691,957 B2 * | 4/2010 | Suzuki et al. | ......... | 526/340.4 |
| 2005/0233894 A1 | 10/2005 | Kaita et al. | | |
| 2007/0055029 A1 | 3/2007 | Suzuki et al. | | |
| 2007/0179267 A1 | 8/2007 | Suzuki et al. | | |
| 2007/0232758 A1 | 10/2007 | Hou et al. | | |

FOREIGN PATENT DOCUMENTS

| | | | |
|---|---|---|---|
| JP | 2004-027179 A | | 1/2004 |
| JP | 2005-015590 A | | 1/2005 |
| JP | 2005-036063 A | | 2/2005 |
| JP | 2007-063240 A | | 3/2007 |
| WO | WO2005/007740 | * | 1/2005 |
| WO | 2006/004068 A1 | | 1/2006 |
| WO | 2007/129670 A1 | | 11/2007 |

* cited by examiner

*Primary Examiner* — Fred M Teskin
(74) *Attorney, Agent, or Firm* — Sughrue Mion, PLLC

(57) ABSTRACT

This invention provides a polybutadiene capable of improving wear resistance and resistance to crack growth in a rubber composition and a tire, wherein values of e, f and g derived from the following determinant (I):

$$\begin{pmatrix} 1.7455 & 0 & -0.0151 \\ -0.0454 & 0.4292 & -0.0129 \\ -0.007 & 0 & 0.3746 \end{pmatrix} \begin{pmatrix} \log_{10}(a/d) \\ \log_{10}(a/b) \\ \log_{10}(a/c) \end{pmatrix} = \begin{pmatrix} e \\ f \\ g \end{pmatrix} \quad (I)$$

(wherein a is a mountain peak value around 1130 $cm^{-1}$ in a transmittance spectrum through Fourier transform infrared spectroscopy (FT-IR), and b is a valley peak value around 967 $cm^{-1}$, and c is a valley peak value around 911 $cm^{-1}$, and d is a valley peak value around 736 $cm^{-1}$) satisfy relationships of equation (II): (Calculated value of cis-1,4 bond)=e/(e+f+g)×100≧99 and equation (III): (Calculated value of vinyl bond)=g/(e+f+g)×100≦0.

6 Claims, No Drawings

POLYBUTADIENE AS WELL AS RUBBER COMPOSITION USING THE SAME AND TIRE

TECHNICAL FIELD

This invention relates to a polybutadiene as well as a rubber composition using the polybutadiene and a tire, and more particularly to a polybutadiene capable of improving a wear resistance and a resistance to crack growth in a rubber composition and a tire.

RELATED ART

Recently, demands on low fuel consumption for automobiles are strongly increasing based on social needs for energy saving and resource saving, and hence it is demanded to develop tires being excellent in the durability such as wear resistance, resistance to crack growth or the like. Therefore, rubber compositions having a low loss property (low heat buildup) and an excellent fracture resistance are demanded as a rubber composition used in a tire tread or the like.

On the other hand, natural rubber is considered to enhance an extension crystallinity owing to its high stereoregularity because a cis-1,4-structure in its microstructure is 99.7%, so that a rubber composition using such natural rubber can improve the durability of the tire. On the contrary, it is known that polybutadiene can also improve the durability of the tire when its microstructure is controlled stereoregularly. For example, when 1,3-butadiene is polymerized, structural isomerism of cis-1,4-structure, trans-1,4-structure and vinyl-1,2-structure are included in the resulting polybutadiene. At this moment, the extension crystallinity of polybutadiene is enhanced by reducing a ratio of vinyl-1,2-structure in the structural isomerism while increasing a ratio of cis-1,4-structure, whereby the durability of the tire can be improved.

For instance, JP-A-2005-36063 discloses a technique of producing a polybutadiene rubber having a cis-1,4-bond content of not less than 99.0% and a vinyl bond content of not more than 0.3% by using a catalyst comprised of a metallocene type cationic complex of a gadolinium compound, while JP-A-2005-15590 discloses a technique of producing a butadiene-based polymer having a cis-1,4-bond content of not less than 98.0% and a vinyl bond content of not more than 0.3% by using a catalyst system comprising specified rare earth element-containing compound, organoaluminum compound and halogen compound.

DISCLOSURE OF THE INVENTION

As a result of the inventors' studies, however, the polybutadiene rubber disclosed in JP-A-2005-36063 and the butadiene-based polymer disclosed in JP-A-2005-15590 cannot develop the extension crystallinity sufficiently, and hence it has been found that there is still a room for improving the stereoregularity of the polymer.

It is, therefore, an object of the invention to provide a polybutadiene capable of improving the wear resistance and resistance to crack growth in rubber compositions and tires. Also, it is another object of the invention to provide a rubber composition using such polybutadiene as a rubber component and a tire using such a rubber composition.

The inventors have made various studies in order to achieve the above objects and found that the wear resistance and resistance to crack growth can be improved when a rubber composition using a polybutadiene, in which a calculated value of cis-1,4 bond defined by using a value derived from a specified determinant is not less than a constant value and a calculated value of vinyl bond is not more than a constant value, as a rubber component is applied to a tire, and as a result, the invention has been accomplished.

That is, the polybutadiene according to the invention is characterized in that values of e, f and g derived from the following determinant (I):

$$\begin{pmatrix} 1.7455 & 0 & -0.0151 \\ -0.0454 & 0.4292 & -0.0129 \\ -0.007 & 0 & 0.3746 \end{pmatrix} \begin{pmatrix} \log_{10}(a/d) \\ \log_{10}(a/b) \\ \log_{10}(a/c) \end{pmatrix} = \begin{pmatrix} e \\ f \\ g \end{pmatrix} \quad (I)$$

(wherein a is a mountain peak value around 1130 cm$^{-1}$ in a transmittance spectrum through Fourier transform infrared spectroscopy (FT-IR), and b is a valley peak value around 967 cm$^{-1}$, and c is a valley peak value around 911 cm$^{-1}$, and d is a valley peak value around 736 cm$^{-1}$) satisfy relationships of the following equations (II) and (III):

(Calculated value of cis-1,4 bond)=$e/(e+f+g)\times 100 \geq 99$     (II)

(Calculated value of vinyl bond)=$g/(e+f+g)\times 100 \leq 0$     (III)

At this moment, the calculated value of cis-1,4 bond and the calculated value of vinyl bond are values calculated by measuring the transmittance spectrum through FT-IR, which are concretely calculated by the following method.

<Analysis of Microstructure Through FT-IR>

A transmittance spectrum of a solution of polybutadiene in carbon disulfide having a concentration adjusted to 5 mg/mL is measured through FT-IR using the same cell of carbon disulfide as a blank to derive values of e, f and g from the determinant (I), which are applied to the following equations (II') and (III') to determine the calculated value of cis-1,4 bond and the calculated value of vinyl bond.

(Calculated value of cis-1,4 bond)=$e/(e+f+g)\times 100$     (II')

(Calculated value of vinyl bond)=$g/(e+f+g)\times 100$     (III')

In this case, the calculated value of cis-1,4 bond is an indicator of cis-1,4 structure included in polybutadiene, wherein the larger the calculated value of cis-1,4 bond, the higher the ratio of cis-1,4 structure included in polybutadiene. On the other hand, the calculated value of vinyl bond is an indicator of vinyl-1,2 structure included in polybutadiene, wherein the smaller the calculated value of vinyl bond, the lower the ratio of vinyl-1,2 structure included in polybutadiene. Moreover, the calculated value of trans-1,4 bond as an indicator of trans-1,4 structure included in polybutadiene can be determined by $f/(e+f+g)\times 100$.

In the polybutadiene according to the invention, it is preferable that the calculated value of cis-1,4 bond satisfies a relationship of the following equation (IV):

(Calculated value of cis-1,4 bond)=$e/(e+f+g)\times 100 \geq 100$     (IV)

The polybutadiene according to the invention is preferable to have a melting point (Tm) of not lower than −5° C.

In a preferable embodiment of the polybutadiene according to the invention, 1,3-butadiene is polymerized in the presence of a polymerization catalyst composition including at least one complex selected from the group consisting of a metallocene complex represented by the following general formula (V):

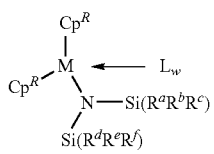

(V)

(wherein M is a lanthanoid element, scandium or yttrium, and $Cp^R$ is independently a non-substituted or substituted indenyl, and $R^a$-$R^f$ are independently an alkyl group having a carbon number of 1-3, and L is a neutral Lewis base, and w is an integer of 0-3), a metallocene complex represented by the following general formula (VI):

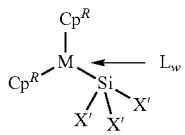

(VI)

(wherein M is a lanthanoid element, scandium or yttrium, and $Cp^R$ is independently a non-substituted or substituted indenyl, and X' is a hydrogen atom, a halogen atom, an alkoxide group, a thiolate group, an amido group, a silyl group or a hydrocarbon group having a carbon number of 1-20, and L is a neutral Lewis base, and w is an integer of 0-3) and a half-metallocene cation complex represented by the following general formula (VII):

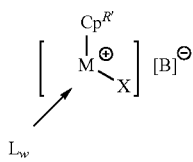

(VII)

(wherein M is a lanthanoid element, scandium or yttrium, and $Cp^{R'}$ is independently a non-substituted or substituted cyclopentadienyl, indenyl or fluorenyl, and X is a hydrogen atom, a halogen atom, an alkoxide group, a thiolate group, an amido group, a silyl group or a hydrocarbon group having a carbon number of 1-20, and Lis a neutral Lewis base, and w is an integer of 0-3, and [B]⁻ is a non-coordinating anion).

The metallocene complex is a complex compound of bonding one or more cyclopentadienyls or a derivative thereof to a center metal. Particularly, a metallocene complex having one cyclopentadienyl or a derivative thereof bonded to the center metal may be called as a half-metallocene complex.

Further, the rubber composition according to the invention is characterized by using the above polybutadiene as a rubber component, and the tire according to the invention is characterized by using such a rubber composition in a tire member, particularly a tread rubber.

According to the invention, it is possible to provide polybutadiene capable of improving wear resistance and resistance to crack growth in rubber compositions and tires, in which a calculated value of cis-1,4 bond defined by using a value derived from a specified determinant is not less than a constant value and a calculated value of vinyl bond is not more than a constant value. Also, there can be provided a rubber composition and a tire each having excellent wear resistance and resistance to crack growth by using such a polybutadiene.

BEST MODE FOR CARRYING OUT THE INVENTION

The invention will be described in detail below. The polybutadiene according to the invention is characterized in that values of e, f and g derived from the determinant (I) satisfy the relationships of the equations (II) and (III). Such a polybutadiene is considerably high in the extension crystallinity because the calculated value of cis-1,4 bond as an indicator for the ratio of cis-1,4 structure included in the polybutadiene is very high and the calculated value of vinyl bond as an indicator for the ratio of vinyl-1,2 structure is very low. The rubber composition using such a polybutadiene as a rubber component can largely improve the wear resistance and resistance to crack growth as compared with a rubber composition using the conventional polybutadiene.

In the polybutadiene according to the invention, it is required that the calculated value of cis-1,4 bond is not less than 99 and the calculated value of vinyl bond is not more than 0. When the calculated value of cis-1,4 bond is less than 99 or when the calculated value of vinyl bond exceeds 0, the polybutadiene is insufficient in the extension crystallinity and the effect of improving the wear resistance and resistance to crack growth in the rubber composition is small. Also, the calculated value of cis-1,4 bond in the polybutadiene is preferable to be not less than 100. In this case, the extension crystallinity of the polybutadiene is further improved, and when such a polybutadiene is used in a rubber composition, the wear resistance and resistance to crack growth of the rubber composition can be further improved.

The polybutadiene according to the invention is preferable to have a melting point (Tm) of not lower than −5° C. At this moment, the melting point is measured using a DSC apparatus (made by TA Instrument Corp.), which is concretely measured by weighing the polybutadiene to 10 mg±0.5 mg, placing it in an aluminum pan and covering with a lid, heating from room temperature to 50° C. and stabilizing for 10 minutes, cooling to −80° C. and stabilizing at −80° C. for 10 minutes, and then warming at a rate of 10° C./min up to 50° C. When the melting point (Tm) is not lower than −5° C., the crystallinity of the polybutadiene becomes considerably higher to thereby improve the tire performances such as wear resistance, resistance to crack growth and the like dramatically.

The polybutadiene according to the invention is preferably formed, but is not limited to, by polymerizing 1,3-butadiene in the presence of a polymerization catalyst composition including at least one complex selected from the group consisting of metallocene complexes represented by the general formulae (V) and (VI) and half-metallocene cation complex represented by the general formula (VII). When 1,3-butadiene is polymerized by using such a polymerization catalyst composition, polybutadiene having a high cis-1,4 bond content in microstructure can be produced in a higher yield.

The polybutadiene can be obtained, for example, by polymerizing 1,3-butadiene in the presence of a polymerization catalyst composition explained in detail later. Moreover, the polymerization method may be the same as in the production method of addition polymers using a usual coordinating ion polymerization catalyst, and any methods such as solution polymerization, suspension polymerization, liquid-phase bulk polymerization, emulsion polymerization, vapor-phase polymerization, solid-phase polymerization and the like can be used. When a solvent is used in the polymerization reaction, it is sufficient that the solvent used is inactive in the polymerization reaction, and the amount of the solvent used is optional, but is preferable to be an amount that the concentration of the complex included in the polymerization catalyst composition is rendered into 0.1-0.0001 mol/l.

The polymerization catalyst composition usable in the synthesis of the polybutadiene according to the invention comprises at least one complex selected from the group consisting of metallocene complexes represented by the general formulae (V) and (VI) and the half-metallocene cation complex represented by the general formula (VII) and further is preferable to contain other component included in the polymerization catalyst composition containing the usual metallocene complex, for example, a co-catalyst or the like.

In the metallocene complexes represented by the general formulae (V) and (VI), $Cp^R$ is a non-substituted indenyl or a substituted indenyl. $Cp^R$ having an indenyl ring as a basic skeleton may be shown by $C_9H_{7-x}R_x$ or $C_9H_{11-x}R_x$, wherein x is an integer of 0-7 or 0-11. Also, R is preferable to be independently a hydrocarbyl group or a metalloid group. The carbon number of the hydrocarbyl group is preferably 1-20, more preferably 1-10, most preferably 1-8. Concretely, as the hydrocarbyl group are preferably mentioned methyl group, ethyl group, phenyl group, benzyl group and the like. On the other hand, as an example of metalloid in the metalloid group are mentioned Ge of germyl, Sn of stanyl and Si of silyl, and the metalloid group is preferable to have a hydrocarbyl group, and the hydrocarbyl group included in the metalloid group is the same as in the above-mentioned hydrocarbyl group. As the metalloid group are concretely trimethyl silyl group and so on. As the substituted indenyl are concretely mentioned 2-phenylindenyl, 2-methylindenyl and the like. Moreover, the two $Cp^R$s in the general formulae (V) and (VI) may be same or different.

In the half-metallocene complex represented by the general formula (VII), $Cp^{R'}$ is a non-substituted or substituted cyclopentadienyl, indenyl or fluorenyl, among which the non-substituted or substituted indenyl is preferable. $Cp^{R'}$ having cyclopentadienyl ring as a basic skeleton is shown by $C_5H_{5-x}R_x$. In this case, x is an integer of 0-5. Also, R is preferable to be independently a hydrocarbyl group or a metalloid group. The carbon number of the hydrocarbyl group is preferably 1-20, more preferably 1-10, most preferably 1-8. Concretely, as the hydrocarbyl group are preferably mentioned methyl group, ethyl group, phenyl group, benzyl group and the like. On the other hand, as an example of metalloid in the metalloid group are mentioned Ge of germyl, Sn of stanyl and Si of silyl, and the metalloid group is preferable to have a hydrocarbyl group, and the hydrocarbyl group included in the metalloid group is the same as in the above-mentioned hydrocarbyl group. As the metalloid group are concretely trimethyl silyl group and so on. As $Cp^{R'}$ having cyclopentadienyl ring as a basic skeleton are concretely exemplified the followings.

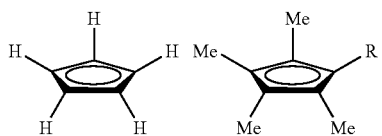

(wherein R is a hydrogen atom, methyl group or ethyl group).

In the general formula (VII), $Cp^{R'}$ having indenyl ring as a basic skeleton is defined in the same manner as in $Cp^R$ of the general formula (V) and also a preferable example thereof is same.

In the general formula (VII), $Cp^{R'}$ having fluorenyl ring as a basic skeleton may be shown by $C_{13}H_{9-x}R_x$ or $C_{13}H_{17-x}R_x$. In this case, x is an integer of 0-9 or 0-17. Also, R is preferable to be independently a hydrocarbyl group or a metalloid group. The carbon number of the hydrocarbyl group is preferably 1-20, more preferably 1-10, most preferably 1-8. Concretely, as the hydrocarbyl group are preferably mentioned methyl group, ethyl group, phenyl group, benzyl group and the like. On the other hand, as an example of metalloid in the metalloid group are mentioned Ge of germyl, Sn of stanyl and Si of silyl, and the metalloid group is preferable to have a hydrocarbyl group, and the hydrocarbyl group included in the metalloid group is the same as in the above-mentioned hydrocarbyl group. As the metalloid group are concretely trimethyl silyl group and so on.

The center metal M in the general formulae (V), (VI) and (VII) is a lanthanoid element, scandium or yttrium. In the lanthanoid element are included fifteen elements of Atomic Numbers 57-71, any one of which may be used. As the center metal M are preferably mentioned samarium Sm, neodymium Nd, praseodymium Pr, gadolinium Gd, cerium Ce, holmium Ho, scandium Sc and yttrium Y.

The metallocene complex represented by the general formula (V) includes bistrialkylsilylamide ligand [—N(SiR$_3$)$_2$]. The alkyl group R ($R^a$-$R^f$ in the formula (V)) included in the bistrialkylsilylamide is independently an alkyl group having a carbon number of 1-3, and methyl group is preferable.

The metallocene complex represented by the general formula (VI) includes silyl ligand [—SiX'$_3$]. X' included in the silyl ligand [—SiX'$_3$] is a group defined likewise X of the general formula (VII) described later, and a preferable group is same.

In the general formula (VII), X is a group selected from the group consisting of a hydrogen atom, a halogen atom, an alkoxide group, a thiolate group, an amido group, a silyl group and a hydrocarbon group having a carbon number of 1-20. As the alkoxide group are mentioned aliphatic alkoxy groups such as methoxy group, ethoxy group, propoxy group, n-butoxy group, isobutoxy group, sec-butoxy group, tert-butoxy group and the like; and aryloxide groups such as phenoxy group, 2,6-di-tert-butylphenoxy group, 2,6-diisopropylphenoxy group, 2,6-dineopentylphenoxy group, 2-tert-butyl-6-isopropylphenoxy group, 2-tert-butyl-6-neopentylphenoxy group, 2-isopropyl-6-neopentylphenoxy group and the like, and among them 2,6-di-tert-butylphenoxy group is preferable.

As the thiolate group shown by X in the general formula (VII) are mentioned aliphatic thiolate groups such as thiomethoxy group, thioethoxy group, thiopropoxy group, thio-n-butoxy group, thioisobutoxy group, thio-sec-butoxy group, thio-tert-butoxy group and the like; arylthiolate groups such as thiophenoxy group, 2,6-di-tert-butylthiophenoxy group, 2,6-diisopropylthiophenoxy group, 2,6-dineopentylthiophenoxy group, 2-tert-butyl-6-isopropylthiophenoxy group, 2-tert-butyl-6-thioneopentylphenoxy group, 2-isopropyl-6-thioneopentylphenoxy group, 2,4,6-triisopropylthiophenoxy group and the like, and among them 2,4,6-triisopropylthiophenoxy group is preferable.

As the amido group shown by X in the general formula (VII) are mentioned aliphatic amido groups such as dimethylamido group, diethylamido group, diisopropylamido group and the like; arylamido groups such as phenylamido group, 2,6-di-tert-butylphenylamido group, 2,6-diisopropylphenylamido group, 2,6-dineopentylphenylamido group, 2-tert-butyl-6-isopropylphenylamido group, 2-tert-butyl-6-neopentylphenylamido group, 2-isopropyl-6-neopentylphenylamido group, 2,4,6-tert-butylphenylamido group and the like; and bistrialkylsilylamido groups such as bistrimethylsilylamido group and the like, and among them bistrimethylsilylamido group is preferable.

As the silyl group shown by X in the general formula (VII) are mentioned trimethylsilyl group, tris(trimethylsilyl)silyl group, bis(trimethylsilyl)methylsilyl group, trimethylsilyl(dimethyl)silyl group, triisopropylsilyl(bistrimethylsilyl)silyl group and the like, and among them tris(trimethylsilyl)silyl group is preferable.

As the halogen atom shown by X in the general formula (VII) may be fluorine atom, chlorine atom, bromine atom or iodine atom, and the chlorine atom or bromine atom is preferable. As the hydrocarbon group having a carbon number of 1-20 shown by X are concretely mentioned straight or branched aliphatic hydrocarbon groups such as methyl group, ethyl group, n-propyl group, isopropyl group, n-butyl group, isobutyl group, sec-butyl group, tert-butyl group, neopentyl group, hexyl group, octyl group and the like; aromatic hydrocarbon groups such as phenyl group, tolyl group, naphthyl group and the like; aralkyl group such as benzyl group or the like; hydrocarbon group containing silicon atom such as trimethylsilylmethyl group, bistrimethylsilylmethyl group or the like, and so on, and among them methyl group, ethyl group, isobutyl group and trimethylsilylmethyl group and so on are preferable.

As the X in the general formula (VII) is preferable bistrimethylsilylamido group or a hydrocarbon group having a carbon number of 1-20.

As the non-coordinating anion shown by [B]⁻ in the general formula (VII) is mentioned, for example, a tetravalent boron anion. As the tetravalent boron anion are concretely mentioned tetraphenylborate, tetrakis(monofluorophenyl) borate, tetrakis(difluorophenyl) borate, tetrakis(trifluororphenyl) borate, tetrakis(tetrafluorophenyl) borate, tetrakis(pentafluorophenyl) borate, tetrakis(tetrafluoromethylphenyl) borate, tetra(tolyl) borate, tetra(xylyl) borate, (triphenyl, pentafluorophenyl) borate, [tris(pentafluorophenyl), phenyl] borate, tridecahydride-7,8-dicarbaundecaborate and the like, and among them tetrakis(pentafluorophenyl) borate is preferable.

The metallocene complexes represented by the general formulae (V) and (VI) as well as the half-metallocene cation complex represented by the general formula (VII) contain further 0-3, preferably 0-1 neutral Lewis base L. As the neutral Lewis base L are mentioned, for example, tetrahydrofuran, diethyl ether, dimethyl aniline, trimethyl phosphine, lithium chloride, neutral olefins, neutral diolefins and so on. At this moment, when the complex contains a plurality of neutral Lewis bases L, such neutral Lewis bases may be same or different.

Also, the metallocene complexes represented by the general formulae (V) and (VI) as well as the half-metallocene cation complex represented by the general formula (VII) may be present as a monomer or may be present as a dimer or more.

The metallocene complex represented by the general formula (V) can be obtained by reacting a lanthanoid trishalide, scandium trishalide or yttrium trishalide with a salt (e.g. potassium salt or lithium salt) of indenyl and a salt (e.g. potassium salt or lithium salt) of bis(trialkylsilyl)amide in a solvent. Moreover, the reaction temperature is sufficient to be about room temperature, so that the complex can be produced under moderate conditions. Also, the reaction time is optional and is about several hours to few ten hours. The reaction solvent is not particularly limited, but is preferable to be a solvent dissolving a raw material and a product and toluene may be used, for example. An example of the reaction for obtaining the metallocene complex represented by the general formula (V) is shown below:

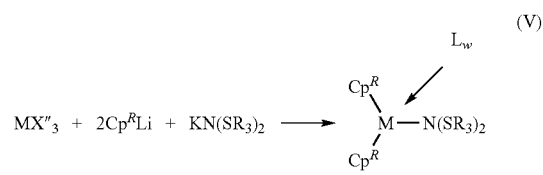

(wherein X" is a halide).

The metallocene complex represented by the general formula (VI) can be obtained, for example, by reacting a lanthanoid trishalide, scandium trishalide or yttrium trishalide with a salt (e.g. potassium salt or lithium salt) of indenyl and a salt (e.g. potassium salt or lithium salt) of silyl in a solvent. Moreover, the reaction temperature is sufficient to be about room temperature, so that the complex can be produced under moderate conditions. Also, the reaction time is optional and is about several hours to few ten hours. The reaction solvent is not particularly limited, but is preferable to be a solvent dissolving a raw material and a product and toluene may be used, for example. An example of the reaction for obtaining the metallocene complex represented by the general formula (VI) is shown below:

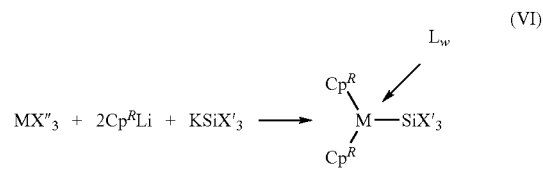

(wherein X" is a halide).

The half-metallocene cation complex represented by the general formula (VII) can be obtained, for example, by the following reaction.

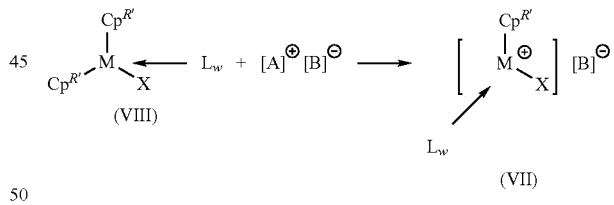

In the compound represented by the general formula (VIII), M is a lanthanoid element, scandium or yttrium, and $Cp^{R'}$ is independently a non-substituted or substituted cyclopentadienyl, indenyl or fluorenyl, and X is a hydrogen atom, a halogen atom, an alkoxide group, a thiolate group, an amido group, a silyl group or a hydrocarbon group having a carbon number of 1-20, and L is a neutral Lewis base, and w is an integer of 0-3. In an ionic compound represented by a general formula [A]⁺[B]⁻, [A]⁺ is a cation and [B]⁻ is a non-coordinating anion.

As the cation shown by [A]⁺ are mentioned, for example, carbonium cation, oxonium cation, amine cation, phosphonium cation, cycloheptatrienyl cation, ferrocenium cation containing a transition metal and so on. As the carbonium cation are mentioned triphenylcarbonium cation, trisubstituted carbonium cation such as tri(substituted phenyl)carbonium cation or the like, and so on. As the tri(substituted phenyl)carbonium cation are concretely mentioned tri(methylphenyl)carbonium cation and the like. As the amine cation are mentioned trialkyl ammonium cation such as trimethyl ammonium cation, triethyl ammonium cation, tripropyl ammonium cation, tributyl ammonium cation or the like; N,N-dialkyl anilinium cation such as N,N-dimethyl anilinium cation, N,N-diethyl anilinium cation, N,N-2,4,6-pentamethyl anilinium cation or the like; dialkyl ammonium cation such as diisopropyl ammonium cation, dicyclohexyl ammonium cation or the like; and so on. As the phosphonium cation are mentioned triaryl phosphonium cation such as triphenyl phosphonium cation, tri(methylphenyl)phosphonium cation, tri(dimethylphenyl)phosphonium cation or the like; and so on. Among these cations, N,N-dialkyl anilinium cation or carbonium cation is preferable, and N,N-dialkyl anilinium cation is particularly preferable.

The ionic compound of the general formula $[A]^+[B]^-$ used in the above reaction is a compound composed of a combination of the selected non-coordinating anion and cation and is preferable to be N,N-dimethylanilinium tetrakis(pentafluorophenyl) borate, triphenylcarbonium tetrakis(pentafluorophenyl) borate or the like. Further, the ionic compound of the general formula $[A]^+[B]^-$ is added to the metallocene complex in a molar amount of preferably 0.1-10 times, more preferably 1 times. Moreover, when the half-metallocene cation complex represented by the general formula (VII) is used in the polymerization reaction, the half-metallocene cation complex represented by the general formula (VII) may be provided to the polymerization reaction system as it is, or the compound of the general formula (VIII) and the ionic compound of the general formula $[A]^+[B]^-$ used in the above reaction may be provided separately to the polymerization reaction system to form the half-metallocene cation complex of the general formula (VII) in the reaction system. Also, by using a combination of the metallocene complex of the general formula (V) or (VI) and the ionic compound of the general formula $[A]^+[B]^-$ may be formed the half-metallocene cation complex of the general formula (VII) in the reaction system.

It is preferable to determine the structures of the metallocene complexes represented by the general formulae (V) and (VI) and the half-metallocene cation complex represented by the general formula (VII) through an X-ray structure analysis.

A promoter usable in the polymerization catalyst composition may be optionally selected from components used as a promoter in the polymerization catalyst composition containing the usual metallocene complex. As the promoter are preferably mentioned, for example, aluminoxane, an organoaluminum compound, the aforementioned ionic compounds and the like. These promoters may be used alone or in a combination of two or more.

As the aluminoxane is preferable an alkylaluminoxane, which includes, for example, methylaluminoxane (MAO), a modified methylaluminoxane and the like. As the modified methylaluminoxane are preferable MMAO-3A (made by Toso Finechem Co., Ltd.) and the like. Moreover, the content of aluminoxane in the polymerization catalyst composition is preferable so that a ratio Al/M of aluminum element Al in the aluminoxane to the center metal M in the metallocene complex is about 10-1000, preferably about 100.

As the organoaluminum compound are mentioned, for example, a trialkylaluminum, a dialkylaluminum chloride, an alkylaluminum dichloride, a dialkylaluminum hydride and the like. Among them, the trialkylaluminum is preferable. As the trialkylaluminum are mentioned, for example, triethylaluminum, triisopropylaluminum and the like. Moreover, the content of the organoaluminum compound in the polymerization catalyst composition is preferably 1-50 times, more preferably about 10 times per 1 mol of the metallocene complex.

In the polymerization catalyst composition, each of the metallocene complexes of the general formula (V) and (VI) as well as the half-metallocene cation complex of the general formula (VII) is combined with an adequate promoter, whereby the content of cis-1,4 bond or the molecular weight of the resulting polymer can be increased.

In the production method of the polybutadiene according to the invention, it is preferable to use the aforementioned polymerization catalyst composition as a polymerization catalyst. As a procedure of this method, for example, (1) components constituting the polymerization catalyst composition may be separately supplied to a polymerization reaction system containing 1,3-butadiene to form the polymerization catalyst composition in such a reaction system, or (2) the previously prepared polymerization catalyst composition may be supplied to the polymerization reaction system. Also, the item (2) includes the provision of a metallocene complex activated by the promoter (active seed). Moreover, it is preferable to conduct each procedure in an atmosphere of an inert gas such as nitrogen, argon or the like. Also, the amount of the metallocene complex included in the polymerization catalyst composition used is preferable to be a range of $^{1}/_{10000}$-$^{1}/_{1000}$ times per 1 mol of 1,3-butadiene.

Also, the number average molecular weight (Mn) of the resulting polybutadiene is not particularly limited and is usually about half a million to several million without causing problem of molecular weight reduction. Further, the molecular weight distribution (Mw/Mn) represented by a ratio of weight average molecular weight (Mw) to number average molecular weight (Mn) is preferably not more than 3, more preferably not more than 2. At this moment, the average molecular weight and the molecular weight distribution can be determined by a gel permeation chromatography (GPC) using polystyrene as a standard substance.

The polymerization temperature in the above polymerization reaction is not particularly limited, but is preferably a range of, for example, −100° C. to 200° C. and may also be about room temperature. If the polymerization temperature becomes too high, cis-1,4 selectivity in the polymerization reaction may be lowered. On the other hand, the reaction time in the polymerization reaction is not particularly limited and is preferably a range of, for example, 1 second to 10 days, but may be properly selected in accordance with a kind of a monomer to be polymerized, a kind of a catalyst, and conditions such as polymerization temperature and the like.

The rubber composition according to the invention is characterized by using the above polybutadiene as a rubber component. The polybutadiene may be blended a general rubber component, concretely natural rubber (NR), styrene-butadiene copolymer rubber (SBR), polyisoprene rubber (IR), common butadiene rubber (BR), butyl rubber (IIR), ethylene-propylene copolymer or the like. Moreover, the amount of these general rubber components used is preferable to be not more than 85 mass % of the rubber component (i.e. total of the polybutadiene according to the invention and the general rubber component).

The rubber composition according to the invention is preferable to further contain a filler. The amount of the filler compounded is not particularly limited, but is preferable to be a range of 25-70 parts by mass based on 100 parts by mass of the rubber component. When the amount of the filler is less than 25 parts by mass, the sufficient reinforcing property may not be obtained, while when it exceeds 70 parts by mass, the workability may be deteriorated. As the filler usable in the rubber composition of the invention are preferable carbon black and/or silica. As the carbon black are mentioned grades of GPF, FEF, SRF, HAF, ISAF, SAF and the like, and as the silica are mentioned wet silica, dry silica, colloidal silica and the like.

In the rubber composition according to the invention may be properly compounded additives usually used in the rubber industry such as an antioxidant, a softening agent, a silane coupling agent, stearic acid, zinc oxide, a vulcanization accelerator, a vulcanizing agent and the like without damaging the object of the invention in addition to the above polybutadiene, general rubber component and filler. As these additives may be preferably used commercially available ones. The rubber composition according to the invention can be produced by compounding the polybutadiene with various additives properly selected if necessary and then milling, warming, extruding them.

The tire according to the invention is characterized by using the above rubber composition, and it is preferable to use the rubber composition in a tread. The tire using the rubber composition in the tread is excellent in the wear resistance and resistance to crack growth. Moreover, the tire according to the invention is not particularly limited except that the above rubber composition is used in any of tire members, and can be manufactured according to the usual manner. As a gas to be filled in the tire may be used usual air or air having an adjusted oxygen partial pressure but also an inert gas such as nitrogen, argon, helium or the like.

EXAMPLES

The following examples are given in illustration of the invention and are not intended as limitations thereof.

Preparation Example 1 of Catalyst

Into a glass bottle of 100 milliliter in volume provided with a rubber plug and dried and purged with nitrogen are sequentially charged 7.11 g of a solution of 1,3-butadiene in cyclohexane (butadiene concentration: 15.2 mass %), 0.59 mL of a solution of neodymium neodecanoate in cyclohexane (neodymium concentration: 0.56 M), 10.32 mL of a solution of methylaluminoxane MAO (PMAO made by Toso Aquzo Co., Ltd.) in toluene (aluminum concentration: 3.23 M) and 7.77 mL of a solution of hydrogenated diisobutylaluminum (made by Kanto Kagaku Co., Ltd.) in hexane (0.90 M), which are matured at room temperature for 2 minutes, and thereafter 1.45 mL of a solution of chlorinated diethylaluminum (made by Kanto Kagalu Co., Ltd.) in hexane (0.95 M) is added and matured at room temperature for 15 minutes with an occasional stirring to obtain a catalyst solution A. The concentration of neodymium in the resulting catalyst solution is 0.011 M (mol/liter).

Preparation Example 2 of Catalyst

Into a glass bottle of 100 milliliter in volume provided with a rubber plug and dried and purged with nitrogen are sequentially charged 7.11 g of a solution of 1,3-butadiene in cyclohexane (butadiene concentration: 15.2 mass %), 0.59 mL of a solution of neodymium neodecanoate in cyclohexane (neodymium concentration: 0.56 M), 10.32 mL of a solution of methylaluminoxane MAO (PMAO made by Toso Aquzo Co., Ltd.) in toluene (aluminum concentration: 3.23 M) and 7.77 mL of a solution of hydrogenated diisobutylaluminum (made by Kanto Kagaku Co., Ltd.) in hexane (0.90 M), which are matured at room temperature for 4 minutes, and thereafter 2.36 mL of a solution of chlorinated diethylaluminum (made by Kanto Kagalu Co., Ltd.) in hexane (0.95 M) is added and matured at room temperature for 15 minutes with an occasional stirring to obtain a catalyst solution B. The concentration of neodymium in the resulting catalyst solution is 0.011 M (mol/liter).

Synthesis of (i-$PrC_5H_4$)$_2$GdN($SiMe_3$)$_2$)

To 20 mL of a solution of $GdCl_3$ (made by STREM Chemical, Inc.) (0.527 g, 2 mmol) in tetrahydrofuran (THF) is added 20 mL of a solution of i-$PrC_5H_4$Na (made by ALDRICH Company) (0.534 g, 4.1 mmol) in THF slowly dropwise in a nitrogen atmosphere, which are stirred at room temperature for 16 hours. Then, THF is distilled off under a reduced pressure, and 30 mL of toluene is added instead, and further 20 mL of K[N($SiMe_3$)$_2$] (made by ALDRICH Company) (0.360 g, 1.8 mmol) in toluene is added slowly dropwise, which are stirred at room temperature for 16 hours. Thereafter, toluene is distilled off under a reduced pressure and 100 mL of hexane is added instead, and precipitates are filtered off through a filter and hexane is distilled off under a reduced pressure to obtain a yellow liquid of (i-$PrC_5H_4$)$_2$GdN ($SiMe_3$)$_2$ (0.805 g, 84%).

Production Example 1 of Polymer

Into a glass bottle of 1 L in volume provided with a rubber plug and dried and purged with nitrogen are charged a solution of dried and purified 1,3-butadiene in cyclohexane and a dried cyclohexane so as to be a state of charging 400 g of 1,3-butadiene in cyclohexane (butadiene concentration: 5 mass %). Then, 1.35 mL of the above catalyst solution A is charged to conduct polymerization in a water bath of 10° C. for 3.5 hours. Thereafter, 2 mL of a solution of 2,2'-methylene-bis(4-ethyl-6-t-butylphenol) (NS-5) as an antioxidant in isopropanol (NS-5 concentration: 5 mass %) is added to stop polymerization reaction, and further the resulting polymer is re-precipitated in isopropanol containing a slight amount of NS-5 and dried in a drum to obtain a polymer A in a yield of approximately 100%.

Production Example 2 of Polymer

Into a glass bottle of 1 L in volume provided with a rubber plug and dried and purged with nitrogen are charged a solution of dried and purified 1,3-butadiene in cyclohexane and a dried cyclohexane so as to be a state of charging 400 g of 1,3-butadiene in cyclohexane (butadiene concentration: 5 mass %). Then, 1.38 mL of the above catalyst solution B is charged to conduct polymerization in a water bath of 10° C. for 4 hours. Thereafter, 2 mL of a solution of 2,2'-methylene-bis(4-ethyl-6-t-butylphenol) (NS-5) as an antioxidant in isopropanol (NS-5 concentration: 5 mass %) is added to stop polymerization reaction, and further the resulting polymer is re-precipitated in isopropanol containing a slight amount of NS-5 and dried in a drum to obtain a polymer B in a yield of approximately 100%.

Production Example 3 of Polymer

In a globe box under a nitrogen atmosphere, 0.1 mmol of bis(isopropylcyclopentadienyl)gadolinium bis(trimethylsilylamide) [i-$PrC_5H_4$)$_2$GdN($SiMe_3$)$_2$], 0.1 mmol of triphenylcarbonium tetrakis(pentafluorophenyl)borate [$Ph_3CB$ ($C_6F_5$)$_4$] and 0.8 mmol of diisobutylaluminum hydride are charged into a sample tube, which are dissolved in 5 mL of toluene to form a catalyst solution C. On the other hand, 390 g of toluene is weighed in a pressure glass bottle of 1000 ml dried sufficiently and closed with a plug to conduct bubbling in a dried argon for 15 minutes. To the bottle is charged 64.8 g of 1,3-butadiene at 0° C. to form a monomer solution. Thereafter, the catalyst solution C is taken out from the globe box and added to the monomer solution to conduct polymerization at 0° C. for 18 hours. After the polymerization, 10 ml of a solution of 10 mass % of 2,6-bis(t-butyl)-4-methylphenol (BHT) in methanol is added to stop the reaction, and further a polymer C is separated with a greater amount of a mixed solvent of methanol/hydrochloric acid and dried at 60° C. under vacuum. The yield of the resulting polymer C is 85 mass %.

Production Example 4 of Polymer

In a globe box under a nitrogen atmosphere, 0.1 mmol of bis(isopropylcyclopentadienyl)gadolinium bis(trimethylsilylamide) [i-PrC$_5$H$_4$)$_2$GdN(SiMe$_3$)$_2$], 0.1 mmol of triphenylcarbonium tetrakis(pentafluorophenyl)borate [Ph$_3$CB(C$_6$F$_5$)$_4$] and 1.0 mmol of diisobutylaluminum hydride are charged into a sample tube, which are dissolved in 5 mL of toluene to form a catalyst solution D. On the other hand, 260 g of toluene is weighed in a pressure glass bottle of 1000 ml dried sufficiently and closed with a plug to conduct bubbling in a dried argon for 15 minutes. To the bottle is charged 64.8 g of 1,3-butadiene at −20° C. to form a monomer solution. Thereafter, the catalyst solution D is taken out from the globe box and added to the monomer solution to conduct polymerization at −20° C. for 5 days. After the polymerization, 10 ml of a solution of 10 mass % of 2,6-bis(t-butyl)-4-methylphenol (BHT) in methanol is added to stop the reaction, and further a polymer D is separated with a greater amount of a mixed solvent of methanol/hydrochloric acid and dried at 60° C. under vacuum. The yield of the resulting polymer D is 43 mass %.

An analysis of microstructure in the polymers A-D produced as mentioned above and commercially available polybutadiene rubber is conduced through the aforementioned FT-IR analytical method. Also, the melting point (Tm) is measured by the following method. The results are shown in Table 1.

(1) Melting Point (Tm)

The melting point (Tm) is measured with a DSC apparatus (made by TA Instrument Corp.) by heating a polybutadiene weighed to 10 mg±0.5 mg and placed in a lid-covered aluminum pan from room temperature to 50° C. and stabilizing for 10 minutes, cooling to −80° C. and stabilizing at −80° C. for 10 minutes, and then warming at a rate of 10° C./min up to 50° C.

As seen from Table 1, the value of cis-1,4 bond and value of vinyl bond calculated through FT-IR analytical method in the polymers C and D obtained by Production Examples 3 and 4 are within ranges defined in the invention. Therefore, it is understood that the polybutadienes of Examples 1 and 2 are high in the ratio of cis-1,4 structure included in polybutadiene and low in the ratio of vinyl-1,2 structure as compared with the polybutadienes of Comparative Examples 1-4.

Then, a rubber composition having a compounding recipe shown in Table 2 is prepared by using the polymers of Examples 1-2 and Comparative Examples 1-4 and vulcanized at 145° C. for 33 minutes to obtain a vulcanized rubber. The wear resistance and resistance to crack growth for the rubber composition are measured by the following methods. The results are shown in Table 3.

(2) Resistance to Crack Growth

In a central portion of a sample of JIS No. 3 is formed a crack of 0.5 mm and fatigue is repeatedly subjected thereto at room temperature and a strain of 50-100% to measure the number until the sample is broken. After the value at each strain is determined, an average value is represented by an index on the basis that Comparative Example 6 is 100. The larger the index value, the better the resistance to crack growth.

(3) Wear Resistance

The worn amount of the sample is measured at room temperature with a Lambourn abrasion tester and a reciprocate of the worn amount is calculated and represented by an index on the basis that Comparative Example 6 is 100. The larger the index value, the smaller the worn amount, which shows that the wear resistance is good.

TABLE 2

| | | Amount compounded (parts by mass) |
|---|---|---|
| Rubber component | polybutadiene *1 | 50.0 |
| | natural rubber | 50.0 |
| Carbon black SAF | | 50.0 |
| Stearic acid | | 2.0 |
| Antioxidant SANTITE A *2 | | 2.0 |
| Antioxidant 6C *3 | | 1.0 |
| Zinc oxide | | 2.5 |
| Vulcanization accelerator D-G *4 | | 0.2 |
| Vulcanization accelerator DM-P *5 | | 0.2 |
| Vulcanization accelerator NS-P *6 | | 0.5 |
| Sulfur | | 1.3 |

*1: A kind of polybutadiene used is shown in Table 3
*2: microcrystalline wax, made by Seiko Kagaku Co., Ltd.
*3: N-(1,3-dimethylbutyl)-N'-phenyl-p-phenylene diamine, made by Ouchi Shinko Chemical Industrial Co., Ltd. Nocrac 6C
*4: N,N'-diphenylguanidine, made by Sanshin Chemical Industry Co., Ltd. Suncelar D-G
*5: dibenzothiazyl disulfide, made by Ouchi Shinko Chemical Industrial Co., Ltd. Nocceler DM-P
*6: N-t-butyl-2-benzothiazolyl sulfenamide, made by Ouchi Shinko Chemical Industrial Co., Ltd. Nocceler NS-P.

TABLE 1

| | Comparative Example 1 | Comparative Example 2 | Comparative Example 3 | Comparative Example 4 | Example 1 | Example 2 |
|---|---|---|---|---|---|---|
| Kind of polybutadiene | BR01 *1 | 150L *2 | Polymer A | Polymer B | Polymer C | Polymer D |
| Calculated value of cis-1,4 bond | 95.82 | 97.52 | 98.53 | 99.05 | 99.08 | 100.04 |
| Calculated value of vinyl bond | 2.63 | 1.40 | 0.39 | 0.13 | −0.06 | −0.05 |
| Tm (° C.) | −10.29 | −7.88 | −6.54 | −5.8 | −3.73 | −2.67 |

*1: polybutadiene rubber made by JSR Corporation
*2: polybutadiene rubber made by Ube Industries, Ltd.

TABLE 3

|  | Comparative Example 5 | Comparative Example 6 | Comparative Example 7 | Comparative Example 8 | Example 3 | Example 4 |
|---|---|---|---|---|---|---|
| Kind of polybutadiene | BR01 *1 | 150L *2 | Polymer A | Polymer B | Polymer C | Polymer D |
| Resistance to crack growth (index) | 87 | 100 | 123 | 132 | 151 | 163 |
| Wear resistance (index) | 90 | 100 | 113 | 115 | 120 | 124 |

*1: polybutadiene rubber made by JSR Corporation
*2: polybutadiene rubber made by Ube Industries, Ltd.

As seen from Table 3, the rubber compositions of Examples 3 and 4 are superior in the wear resistance and resistance to crack growth to the rubber compositions of Comparative Examples 5-8 because polybutadiene having values of cis-1,4 bond and vinyl bond calculated by the analysis method through FT-IR within ranges defined in the invention is used as a rubber component.

The invention claimed is:

1. A polybutadiene characterized in that values of e, f and g derived from the following determinant (I):

$$\begin{pmatrix} 1.7455 & 0 & -0.0151 \\ -0.0454 & 0.4292 & -0.0129 \\ -0.007 & 0 & 0.3746 \end{pmatrix} \begin{pmatrix} \log_{10}(a/d) \\ \log_{10}(a/b) \\ \log_{10}(a/c) \end{pmatrix} = \begin{pmatrix} e \\ f \\ g \end{pmatrix} \quad (I)$$

(wherein a is a mountain peak value around 1130 cm$^{-1}$ in a transmittance spectrum through Fourier transform infrared spectroscopy (FT-IR), and b is a valley peak value around 967 cm$^{-1}$, and c is a valley peak value around 911 cm$^{-1}$, and d is a valley peak value around 736 cm$^{-1}$) satisfy relationships of the following equations (II) and (III):

(Calculated value of cis-1,4 bond)=$e/(e+f+g) \times 100 \geq 99$    (II)

(Calculated value of vinyl bond)=$g/(e+f+g) \times 100 \leq 0$    (III), wherein the polybutadiene has a melting point (Tm) of not lower than −5° C.

2. A polybutadiene according to claim 1, wherein the calculated value of cis-1,4 bond satisfies a relationship of the following equation (IV):

(Calculated value of cis-1,4 bond)=$e/(e+f+g) \times 100 \geq 100$    (IV).

3. A polybutadiene according to claim 1, wherein 1,3-butadiene is polymerized in the presence of a polymerization catalyst composition including at least one complex selected from the group consisting of a metallocene complex represented by the following general formula (V):

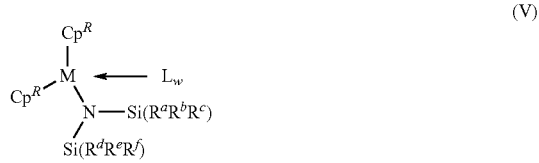

(V)

(wherein M is a lanthanoid element, scandium or yttrium, and Cp$^R$ is independently a non-substituted or substituted indenyl, and R$^a$-R$^f$ are independently an alkyl group having a carbon number of 1-3, and L is a neutral Lewis base, and w is an integer of 0-3), a metallocene complex represented by the following general formula (VI):

(VI)

(wherein M is a lanthanoid element, scandium or yttrium, and Cp$^R$ is independently a non-substituted or substituted indenyl, and X' is a hydrogen atom, a halogen atom, an alkoxide group, a thiolate group, an amido group, a silyl group or a hydrocarbon group having a carbon number of 1-20, and L is a neutral Lewis base, and w is an integer of 0-3) and a half-metallocene cation complex represented by the following general formula (VII):

(VII)

(wherein M is a lanthanoid element, scandium or yttrium, and Cp$^{R'}$ is independently a non-substituted or substituted cyclopentadienyl, indenyl or fluorenyl, and X is a hydrogen atom, a halogen atom, an alkoxide group, a thiolate group, an amido group, a silyl group or a hydrocarbon group having a carbon number of 1-20, and L is a neutral Lewis base, and w is an integer of 0-3, and [B] is a non-coordinating anion).

4. A rubber composition characterized by using a polybutadiene as claimed in claim 1 as a rubber component.

5. A tire characterized by using a rubber composition as claimed in claim 4 in any tire member.

6. A tire according to claim 5, wherein the tire member is a tread.

\* \* \* \* \*